United States Patent [19]

Kieran et al.

[11] Patent Number: 4,568,406
[45] Date of Patent: Feb. 4, 1986

[54] CAP-LINING MACHINE

[75] Inventors: Thomas G. Kieran; Newton R. Rickenbach, both of Tempe, Ariz.

[73] Assignee: Top Seal Corporation, Ariz.

[21] Appl. No.: 740,711

[22] Filed: Jun. 3, 1985

[51] Int. Cl.$^4$ .............................................. B26D 5/00
[52] U.S. Cl. .................................. 156/355; 156/262; 156/265; 156/518; 156/521; 413/64
[58] Field of Search ............... 156/261, 262, 264, 265, 156/520, 518, 521, 353–355, 528; 413/9, 58, 63, 64

[56] References Cited

U.S. PATENT DOCUMENTS

| | | | |
|---|---|---|---|
| 1,134,031 | 3/1915 | Clark | 156/521 X |
| 1,628,338 | 5/1927 | Skov | 156/355 |
| 2,391,381 | 12/1945 | Belada | 413/64 X |
| 2,585,250 | 2/1952 | Jones et al. | 156/521 X |
| 2,912,042 | 11/1959 | Jenkins | 413/9 |

Primary Examiner—David Simmons
Attorney, Agent, or Firm—LaValle D. Ptak

[57] ABSTRACT

A cap-lining machine is constructed with a minimal number of mechanical parts and is provided with a modular and quickly replaceable liner punch and insert station, which readily may be changed to accommodate caps of different diameters with a minimum amount of down time. In addition, sensing switches are employed with an electronic control system in lieu of conventional mechanical connections to prevent the machine from moving on to the next step in its operation unless all previous steps of operation have been completed in proper sequence. Operation interruption is accomplished in a jam-proof manner.

16 Claims, 5 Drawing Figures

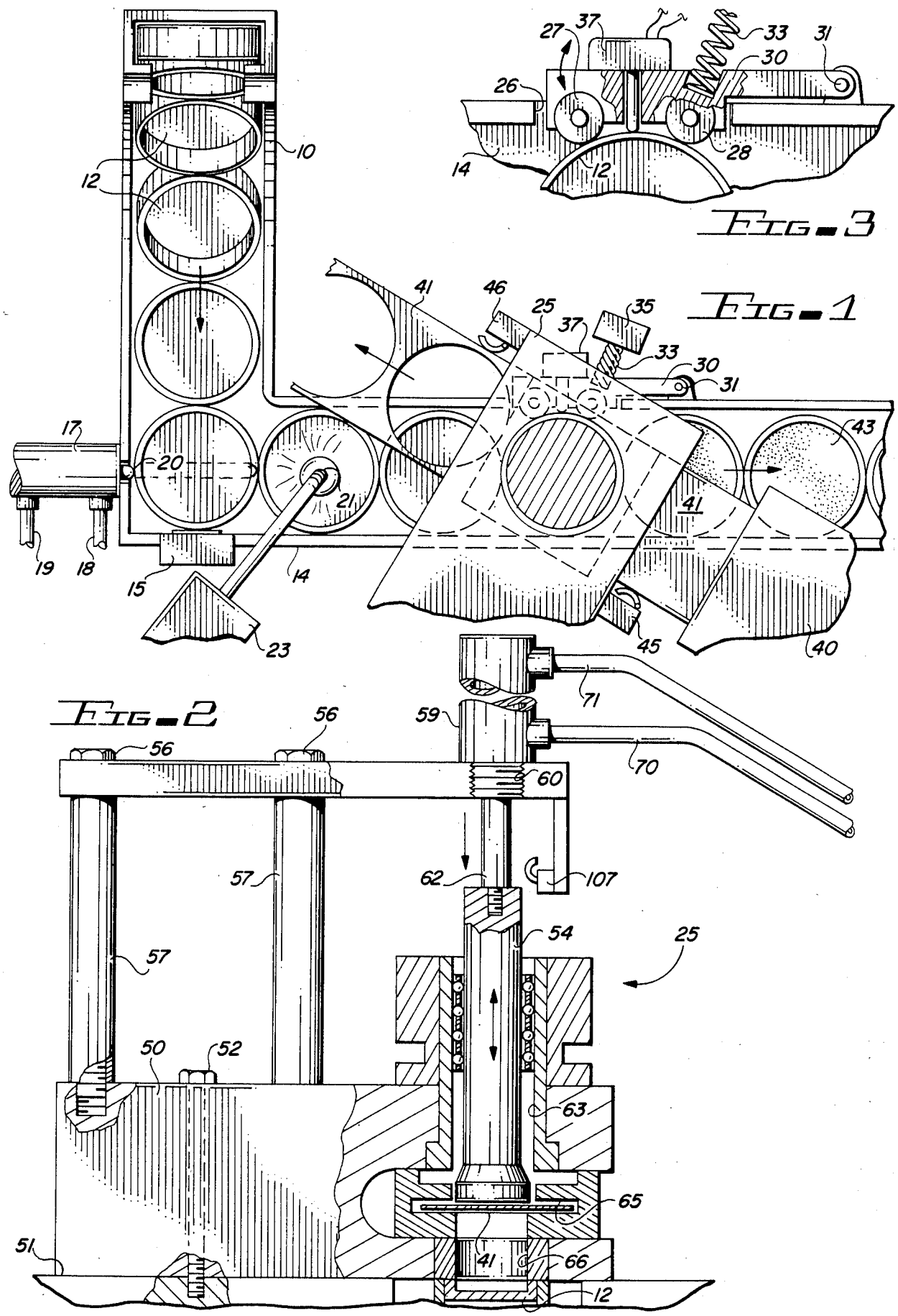

CAP-LINING MACHINE

BACKGROUND

Container closures or caps of the reusable type are utilized on a wide variety of products. Typical products include beverages, vitamins, condiments and the like. Such caps, whether made of plastic or metal, generally are provided with a lining in the form of coated aluminum foil membranes, plastic-coated paper or other suitable material.

In assembling a liner into a cap or closure for containers, machines generally are employed which feed the inverted caps sequentially to an assemblying station. A strip of lining material is also fed to the assemblying station and is positioned over the inverted caps where the liners are punched from the strip of lining material and are assembled into the caps. The movement of the caps and lining material to the assembly station, along with the movement of the punch or other assemblying mechanisms generally are controlled by a mechanically interlocked machine involving large numbers of cams, gears and the like. Because of the complex mechanical interraction of parts which are required for the operating sequence, relatively large electric motors also are required to power such machines.

The nature of most cap-lining machines which currently are used also is such that if a change from one cap size or diameter to another is desired, significant modifications must be made to the machine. This requires skilled mechanics and results in considerable machine "down-time" to effect the changeover from one size of caps to another. In many installations, where large numbers of caps of different sizes are manufactured and lined, it is not uncommon to have different machines set up to handle different sized caps, even though such machines frequently sit idle for long periods of time between the times caps of the particular size for which a machine has been set up are to be lined. In addition, because of the substantial mechanical complexity of most cap-lining machines, many opportunities for mechanical failure and the wearing out of parts exist. Consequently, it also has been common practice to provide idle backup machines for high production facilities to prevent the interruption of production whenever machines require maintenance, which is often.

In many cap-lining machines of the prior art, if, for some reason, the cap-feeding mechanism fails to sequentially feed caps, it was possible for the punch and insert mechanism to attempt to insert a second liner into a cap at the liner inserting station of the machine. Because of the close tolerances involved, this results in a jamming of the punch and frequently expensive mechanical failure of gears, cams and levers in the machine. In addition, if the web of liner fails to advance in synchronization with the cap feeding operation, it is possible in many prior art machines to continue operation without the insertion of liners into some caps. Unless a provision is made for detecting (either automatically or manually) the presence or absence of liners in caps coming out of the machine, it is possible to produce large numbers of defective caps which, subsequently, when applied to containers to close them, would result in inadequate seals for the containers on which they are used.

Attempts have been made on some prior art machines to interrupt operation of the machine when an abnormal condition (such as a missing cap) occurs. One such machine is shown in the patent to Belada, U.S. Pat. No. 2,391,381. This patent is directed to a mechanical cap-lining machine with a large number of moving parts and requiring a large electric motor to power it. An electrical sensing switch, however, is used in Belada to detect a missing cap just prior to the punch/insertion stage to stop operation of the paper stock feed whenever a cap is missing in this position. The sensing of a missing cap, however, does not stop the punch or any of the other mechanisms in the operation of the machine. In addition, this machine does not have a structure which permits rapid changeover from one size cap and liner combination to another.

Another machine which operates in a manner similar to Belada is disclosed in the patent to Jenkins, U.S. Pat. No. 2,912,042. The Jenkins machine also is a mechanical machine, including gears, cams and levers for synchronizing the feeding of liner material with the feeding of closures to a closure-liner insertion position. A provision is made for detecting the failure of the machine to present a closure to the insertion station to cause temporary interruption of the feed of liner material to the liner insertion punch. No other provisions for interrupting operation in response to other types of failure, however, are present and the machine is subject to the same changeover limitations or disadvantages mentioned above in conjunction with the Belada patent.

It is desirable to provide a cap-lining or closure-lining machine which is not subject to the disadvantages of the prior art mentioned above. Specifically, it is desirable to provide a cap-lining machine which minimizes the complicated mechanical interconnections of the various stages of conventional cap-lining machines. It further is desirable to provide a cap-lining machine which readily may be changed over to handle caps of different sizes with a minimum amount of down-time required to effect such a changeover.

SUMMARY OF THE INVENTION

Accordingly, it is an object of this invention to provide an improved cap-lining machine.

It is another object of this invention to provide an improved cap-lining machine having a minimum number of mechanical parts.

It is an additional object of this invention to provide a cap-lining machine of modular construction.

It is a further object of this invention to provide a cap-lining machine which incorporates sensors to detect malfunctions at different points in the operating sequence for interrupting operation of the machine.

In accordance with a preferred embodiment of this invention, a cap-lining machine includes a liner punching and insert station. Liner is supplied to the liner punching and insert station, and caps are successively fed from a feeding station to the liner punching and insert station. A provision is made for sensing the presence of a cap at the liner and punching station and for sensing the presence of a cap at a feeding station to prevent the operation of the liner punching and insert apparatus in the absence of the sensing of the presence of a cap at either the liner punching and insert station or the feeding station.

BRIEF DESCRIPTION OF THE DRAWINGS

FIG. 1 is a partially-cutaway top view of a cap-lining machine in accordance with a preferred embodiment of this invention;

FIG. 2 is a detailed view of the punch at the liner punching and insert position of the machine shown in FIG. 1;

FIG. 3 is a detail of a portion of the machine shown in FIG. 1;

DETAILED DESCRIPTION

Figure 4:
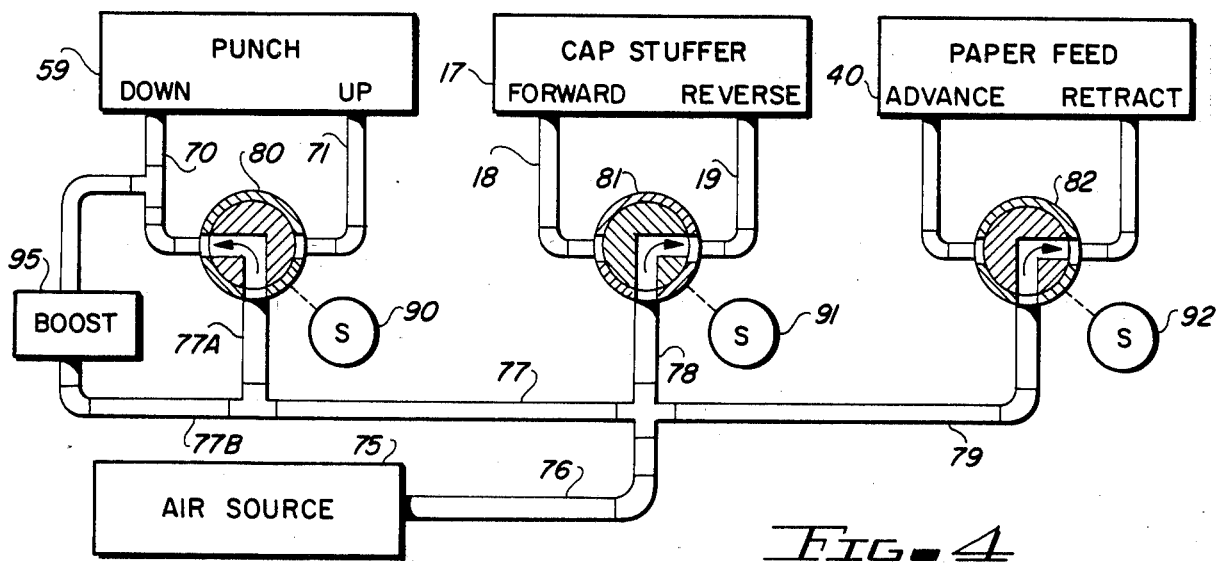
FIG. 4 is a diagrammatic representation of a portion of the machine shown in FIG. 1.

Reference now should be made to the drawings in which the same or similar reference numbers are used throughout the different figures to designate the same or similar components. FIG. 1 is an overall top view of a preferred embodiment of a cap-lining machine made in accordance with the invention. Closures or caps to be lined are supplied from a supply bin (not shown) through a curved chute 10 which constitutes a gravity feed for caps from the supply. A number of caps 12 are illustrated in different orientations as they drop down this curved chute 10 to a point where they engage a guide channel 14 at a sensing microswitch 15. The channel 14 is at right angles to the chute 10. When a supply of caps is present from the cap supply, the lowermost cap 12 in the chute 10 presses against a microswitch 15, which provides a signal indicative of a cap 12 present at the juncture of the chute 10 and the channel 14.

An air cylinder 17 having an "actuate" air supply line 18 and a "retract" air supply line 19 is located at the left side of the lowermost edge of the chute 10 in a position to cause a plunger or "stuffer" rod 20 operated by the air cylinder 17 to engage the center of the left-hand edge of a cap 12 (as viewed in FIG. 1). The rod 20 is shown in its retracted position in FIG. 1. Upon provision of air through a supply line 18, the rod 20 extends to the dotted line position illustrated in FIG. 1 to move the cap 12 located at the bottom of the chute 10 to the next position to the right in the channel 14, as viewed in FIG. 1. A cap in this position is located directly beneath the end of a glue gun nozzle 21, which is supplied with a shot of glue from a reservoir 23 when the plunger 20 retracts back to the solid line position upon the termination of air supplied to the line 18 and resumption of air supply through the line 19. A microswitch (not shown) is operated when the rod 20 retracts to the solid line position shown in FIG. 1 after being extended to the dotted line position to initiate a following sequence of events.

It is apparent that when both the channel 14 and the chute 10 are full of caps 12, each operation of the rod 20 moves the caps in the channel 14 one full place (equal to the outside diameter of the caps) to the right. After the rod 20 has retracted, the next cap 12 in the chute 10 slides down the chute and engages the microswitch 15 to indicate the presence of the next cap.

Two cap positions to the right of the one which is located under the glue gun nozzle 21, a cap 12 is centered beneath a liner punch and insert station 25. The cap at this station is centered by means of a 3-point centering device. As viewed in FIG. 1, one point of these three points constitutes the lower edge of the channel 14. On the opposite side, the channel 14 has an opening 26 cut in the side wall to permit a pivoted, spring-biased centering device to engage the cap 12 at two spaced-apart points on a pair of centering rollers 27 and 28, carried on a pivoted arm 30. The arm 30 pivots about a pivot point 31 located to the right of the opening 26 (as viewed in FIGS. 1 and 3) and is biased by a compression spring 33 to extend the rollers 27 and 28 into the space between the side walls of the channel 14. As illustrated in FIG. 1, the spring 33 as extends between the arm 30 and a block 35 which is attached to the table or support on which the channel 14 is mounted. It is readily apparent from an examination of FIGS. 1 and 3 that, each time a new cap 12 is moved into position, so that it is engaged by both of the rollers 27 and 28, it automatically is centered in the same position as each previous cap by means of the centering rollers 27 and 28.

A microswitch 37 (shown most clearly in FIG. 3) has a sensing contact extending into the space between the rollers 27 and 28 to engage the edge of a cap 12 in position between the rollers to produce a signal indicative of the presence of a cap in this position, the liner insert position. If no cap is present, the switch 37 also provides a signal indicative of the absence of a cap 12.

Once a cap is in position between the rollers 27 and 28, which cause it to be centered beneath the punch and insert station, the punch in the station 25 is energized to punch out a liner insert and press it into place into the cap 12 where the liner insert is bonded by the glue previously placed in the cap by the glue gun 21. FIG. 2 shows some of the details of this punch and insert station. The liner material (of any suitable conventional type) is supplied from a paper or liner feeder device 40 in the form of an elongated strip or web 41 to the liner punch and insert station 25. This web of material 41 leaves the liner punch and insert station 41 with circular holes punched out of it. These circular cut-outs constitute the liner inserts which are inserted into each cap 12 when it is in position beneath the plunger 54 of the punch and insert station 25 between the rollers 27 and 28.

The paper feeder 40 and the material 41 constituting the web of liner material are standard, and further details of these components are not considered necessary here. Microswitches or photoelectric switches (depending upon the particular application) 45 and 46 are used to sense the presence of the web 41, both at the input to the punching and insert station 25 and at the exit of the punching and insert station 25. The failure of the web 41 to be present at either of these locations is sensed and is utilized to prevent further operation of the machine, as is described in greater detail subsequently.

The punch block 50 is attached to a table 51 on which the machine is mounted by means of threaded bolts 52 (one of which is shown in FIG. 2). Different punch blocks 50 are used for different sizes of caps 12, one of which is shown in position beneath a punch 54 in FIG. 2. If caps 12 of a diameter other than the one illustrated in FIG. 2 are to be lined, the entire punch block 50 is removed by unbolting it from the table 51 and a new punch block 50, having a punch of the proper punch diameter, is reattached to the table 51 by means of the bolts 52. This is a modular construction for the punch and liner insert station; and, since the punch is not interconnected mechanically with any of the other components shown in FIG. 1, a change in the size of the punch and liner mechanism readily may be effected. It also is necessary to change the channel 14 and the supply chute 10 to corresponding components having a width which is slightly greater than the outside diameter of a new size of cap whenever a change in cap size is to be accomplished. As is readily apparent from an examination of FIG. 1, however, this change also is easily made once the block for the punching and insert station 25 is removed. A new block 50 is put in place over the new channel 14, and the system is quickly reconfigured to handle caps of different sizes.

For any given punch block 50, the actual punch and die is attached by means of threaded fasteners 56 to the block 50 through hollow, cylindrical extensions 57 as illustrated in FIG. 2. An air cylinder 59 for driving downwardly and retracting an otherwise standard ball bearing bushing punch 54 is threaded in position at 60 as illustrated in FIG. 2. The ram 62, which is operated by the air cylinder 59, is threaded into the top of the ball bearing bushing punch 54, which reciprocates in the sleeve 63 of the punch and die set. The liner web 41 moves in a slot 65 beneath the lower end of the punch 54 which is used to punch out a circular insert from the web 41. This insert then is carried downward through the die 66 and is pressed in place into the bottom of the open cap 12, located in the channel 14 immediately beneath the punch and die insert station. Air for driving the punch 54 downward is supplied to the air cylinder 59 through an air inlet line 70; and air for pulling the punch 54 upward is supplied through a line 71.

Reference now should be made to FIG. 4, which shows the air supply or air source 75 connected through a main supply line 76 to three branches 77, 78 and 79, which supply air to the punch air cylinder 59, the cap stuffer air cylinder 17 and the paper feeder air cylinder 40, respectively. The direction in which each of these three air cylinders are operated is effected by means of a control valves 80, 81 and 82, respectively. The valves are shown in partially-cutaway schematic representation to indicate the direction of air flow into either of the two control lines for each of the cylinders 59, 17 and 40, respectively, to control the direction of movement of the particular mechanisms controlled by such cylinders. Each of the valves 80, 81 and 82 are switched 90 degrees to supply air from the respective air inlet line 77, 78 or 79 to one or the other of two outline lines through the corresponding valve. This control is effected by means of electrically-operated switches or solenoids 90, 91 and 92, respectively.

In addition to the supply of air through the valve 80 to the inlet line 70 to drive the punch 54 downward by means of the punch cylinder 59, an air boost supply 95 is also utilized at the time the punch contacts the web 41 to sever the insert from the web and drive it downward into the cap 12. This boost 95 acts in parallel with the air supply from the valve 80 when the punch 54 is to be driven downward. The boost 95 is released at all other times.

The actual electrical interconnections between the various switches which have been described thus far and to the switches or solenoids 90, 91, 92 and the boost 95 for the punch cylinder 59 have not been illustrated in order to avoid cluttering the drawings. The interconnections necessary for operating the system in a "fail-safe" manner may be accomplished in a variety of different ways. Ideally, a microprocessor is utilized with a program for sensing and responding to the opening and closure of various switches, operated in conjunction with the operating sequence described above, to terminate operation of all or a part of the system at any time an operation fails to occur in its proper sequence. Hard-wired circuitry also may be employed, and FIG. 5 is an illustration of the electrical operating sequence and the switching circuitry necessary for insuring a fail-safe, mistake-proof, jam-proof operation of the system.

Figure 5:
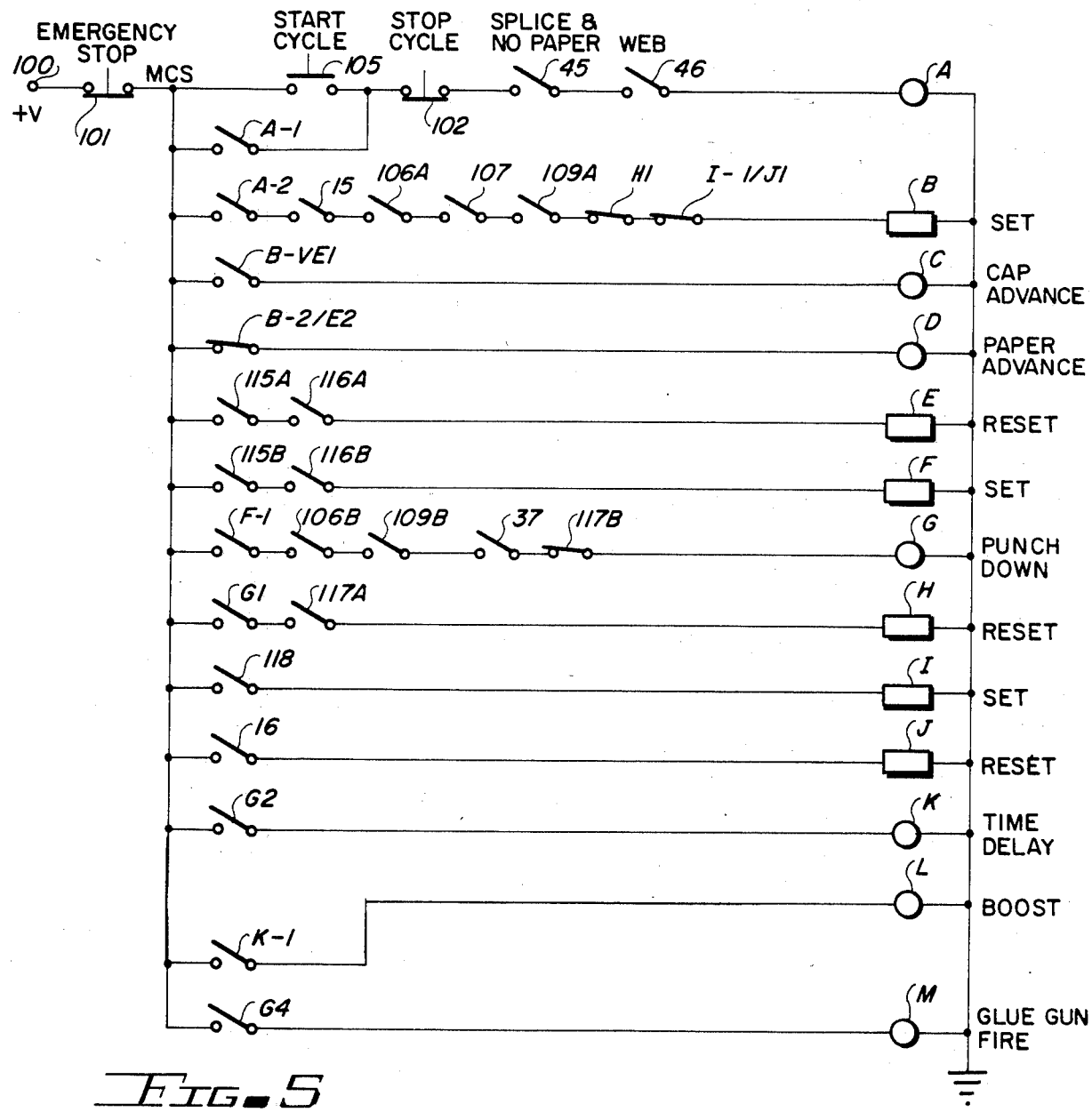
FIG. 5 is a system schematic of the operating sequence of the machine shown in FIGS. 1 through 4.

As illustrated in FIG. 5, the electrical system includes a source of positive direct current voltage 100 supplying a number of parallel switching circuits connected between it and ground. A main emergency stop button 101 is provided between the source 100 and all of the remaining circuits shown in FIG. 5. At any time an operator wishes to stop operation of the system, irrespective of where the system is in the cycle of operation, the emergency stop button 101 may be depressed to remove operating power from the entire system. Everything will stop immediately any time the emergency stop button 101 is depressed.

Under normal conditions of operation, however, the emergency stop button 101 is closed, as illustrated in FIG. 5. This permits normal operation to commence. In addition to the emergency stop push button 101 there is a cycle stop button 102 located in the upper parallel line of contacts shown in FIG. 5. The cycle stop button 102 also normally is closed. Whenever the button 102, however, is opened during a cycle of operation, that cycle of operation is permitted to be completed; but the initiation of a new cycle of operation is prevented.

To commence operation of the system, both the emergency stop push button 101 and the stop cycle push button 102 are closed. In addition, a paper web 41 must be in position both entering and leaving the liner punch and insert station 25, as sensed by the switches 45 and 46. Thus, these switches (shown open in FIG. 5) are closed. The normal condition of operation, so long as paper is being supplied from the paper feeder 40, is for the switches 45 and 46 to be closed. A normally-open "start cycle" switch 105 now is momentarily closed. This completes an electrical circuit from the source 100 through the now-closed switches 101, 102, 45 and 46 to a holding relay "A", operating the relay to close a pair of holding contacts A-1 and A-2. The contact A1 is connected in parallel across the start cycle push button 105; so that subsequent release (and therefore opening) of the push button 105 after its momentary closure has no effect on the remainder of the operation of the system. The system will continue to operate until the stop cycle switch 102 or the emergency stop switch 101 are opened, or if an abnormal condition occurs in some other part of the system (to be described). A number of additional "start" conditions must be met before the machine commences its cycle. Closure of the contact A-2 commences operation of a machine cycle provided these other conditions are met. First, the switch 15 (described previously in conjunction with FIG. 1) must be closed to indicate the presence of a cap 12 in the cap advance or feed position of the channel 14. The paper feed mechanism must be retracted (closing a switch 106, not shown in FIG. 1) to indicate that the paper feed mechanism has completed a cycle and is ready for its next cycle of operation. The paper punch 54 must be in its up or retracted position, closing a switch 107, and the cap advance stuffing rod 20 must be retracted to close the switch 109-A (mentioned in conjunction with FIG. 1 but not shown therein). In addition to closure of these normally open contacts, normally closed relay contacts H-1 and I-1/J-1 permit completion of an operating circuit through the switch 101 to a latching relay "B". Operation of relay "B" closes the contact B-1/E-1 to energize the solenoid "C", coupled to the switch 91 (FIG. 4) to flip the valve 81 from the position shown in solid lines in FIG. 4 to a position interconnecting the supply line 78 with the line 18. This drives the air cylinder 17 of the cap stuffer forward to push the cap advance rod 20 outwardly to the dotted line position shown in FIG. 1, advancing a new cap 12 to the inner punch and insert station 25. At the same time, the normally closed contact B-2/E-2 is opened by the operation of the latching relay "B" to allow a solenoid "D" to vent and permit advancing of the paper web 41 from the paper feeder 40 to cause an unpunched segment of paper to be presented to the punch in the liner punch and insert station 25.

When the rod 20 of the cap stuffer advance air cylinder 17 is extended to the full dotted line position shown in FIG. 1, a pair of contacts 115-A and 115-B are closed. At the same time, when the paper feed air cylinder 40 has advanced the paper web 41 a full segment, a pair of contacts 116-A and 116-B are closed to indicate proper operation of the paper feeder 20. Closure of the contacts 115-A and 116-A energizes a reset relay "E" which opens the contact B-1/E-1 and closes the contact B-2/E-2. The opening of the contact B-1/E-1 terminates the cap advance operation and prevents another cap advance operation from taking place until the contact B-1/E-1 subsequently is closed again by the operation of the relay B. The switch 91 operates the valve 81 to the solid line position in FIG. 4 to retract the rod 20 into the cylinder 17.

At the same time, a latch relay "F" is operated by closure of the contacts 115-B and 116-B. Energization of the relay "F" closes the contact F-1 which completes the circuit the solenoid "G" through the now closed contacts 106-B and 109-B indicating the retraction of the paper feed mechanism and the retraction of the cap stuffing rod 20 respectively. Thus, the paper web 41 is not moving, the caps 12 are not moving; and the punch down solenoid "G" is operated provided switch 37 is closed by the presence of a cap 12 beneath this punch 54. This causes the solenoid switch 90 to flip the valve 80 to the position shown in solid lines in FIG. 4 to initiate operation of the downward movement of the shaft 62 and the punch 54 of FIG. 2. When the punch down solenoid "G" is energized, it closes the contact G-1 to prepare completion of a circuit to a reset solenoid "H". Another switch 117-A (not shown in FIGS. 1 or 2) is closed and 117-B is opened when the punch 54 is completely down, or at its lowermost position (as viewed in FIG. 2), to seat a liner insert disc in the cap 12. This completes an operating circuit to the reset latch relay "H" to operate that relay. Operation of the relay "H" opens a contact H-1 in the energizing path for the set relay "B" to maintain release of the Relay "B". When the cap stuffer rod 20 advanced a cap 12 in the beginning of the cycle, a contact 118 closed. This causes energization of the latch relay "I" to open the normally closed contact I-1/J-1 in the operating path for relay "B". As the cap 12 is advanced by the stuffer rod it comes off the switch 15, permitting that switch to open. This causes a switch 16 to be closed. The switch 16 and the switch 15 actually are operated off the same microswitch sensor or plunger, only they are opposite side contacts, i.e., when switch 15 is closed, 16 is open and vise-versa. As the cap 12 is moved off the switch 15, the fail safe switch contacts 16 close. This supplies an energizing current to a reset relay "J" which operates to once again close the contact I-1/J-1 in the energizing path for the relay "B". The reason for this is that if a cap 12 does not advance, the contact I-1/J-1 remains open due to the operation of the latch relay "I" and this would prevent the cycle from being repeated until intervening corrected action was taken.

Returning back to the action of the punch 54, as the punch solenoid "G" is energized, the contact G-2 is closed to energize a time delay relay "K". The time delay relay "K" immediately operates for approximately 1/10 second to close a normally-open contact K-1. During the time the contact K-1 is closed punch boost relay "L" connected to the apparatus 95 to enable that to supply an additional boost of air pressure through the line 70 to the paper punch air cylinder 57 to drive the punch through the web 41. This additional power is applied in synchronism with the main air supply through the valve 80 and is timed to give an extra boost of power to the punch just as it contacts and goes through the paper web 41.

Operation of the punch down relay "G" also closes contact G-4 to enable the glue gun unit 23 to apply a spray of glue through the nozzle 21 in the manner described previously in conjunction with FIG. 1.

When the contact 117-B is opened at the time insert is seated in the cap 12, the punch down relay "G" is released to operate the switch 90 to turn the valve 80 to interconnect the line 77 with the line 71 to drive the punch air cylinder 59 back to its uppermost position. The contacts G-1, G-2 and G-4 open releasing the relays which are connected in series with these contacts and terminating the operation which is effected by those relays. When the relay "H" releases, the contact H-1 once again closes. The gravity feed of caps in the chute 10 presses a new cap against the switch 15, closing that switch and opening the switch 16. Thus, the system automatically recycles with the reenergization of the set relay "B" which initiates the operation of the cap advance stuffer 17 and the paper feed 40 to move a new cap into position and to supply the next segment of liner web 41 to the liner punch and insert station 25.

This cycle of operation repeats automatically until there is failure of some component to function in a proper manner. If such a failure occurs, the contacts associated with that particular element prevent the next operation in the cycle from taking place. The result is a system which automatically stops operation without any damage whatsoever to any of the components in the event a malfunction of any type occurs in the operating sequence. Because of the simplicity of the machine, it is a relatively simple matter to visually inspect the machine to see where the malfunction has occurred (and indicator lights associated with the various switches of FIG. 5 also can provide assistance in doing this).

As as readily apparent from an examination of the drawings, manual clearing of a jammed or stuck cap in either the chute 10 or the channel 14 or removal or insertion of paper web 41 into the liner punch and insert station 25 may be effected without any possibility of physical harm. The punch and die block are completely sealed, and the slot 65 is too narrow for an operator to get his or her fingers into the space through which the web 41 moves. Compared to prior art machines, the safety aspects of the machine which is illustrated in the drawings and which has been described above are extremely significant. In addition, the control circuitry which terminates the cycle as soon as any malfunction in the sequence occurs, prevents the production of a defective product and prevents damage to the machine.

Various changes and modifications will occur to those skilled in the art upon review of the machine which has been disclosed. The embodiment which has been shown and described is to be considered illustrative only and not as limiting of the invention. The control sequence which is employed can also be utilized in machines of a different type from the specific one which has been disclosed. Hydraulic cylinders instead of air cylinders may be used for driving the punch, cap-advance, and paper feed mechanism. Various ones of the control and sensing mechanisms may be employed on machines which employ a rotating table mechanical feed of caps to a liner punch and insert station such as the station 25. In some cases, photoelectric switches may be used instead of the microswitches which have been described without departing from the intent and function of these switches.

We claim:

1. A cap-lining machine including in combination:
supply means for supplying caps to be lined;
liner punching and insert means moveable between retracted and punching positions;
liner supply means for supplying liner to said liner punching and insert means;
feeding means for successively feeding caps from said supply means to said liner punching and insert means;
first sensing means for sensing the presence of a cap at said liner punching and insert means;
second sensing means for sensing the presence of a cap at said feeding means; and
means coupled with said first and second sensing means for preventing the operation of said liner punching and insert means in the absence of the sensing of the presence of a cap by either of said first or second sensing means.

2. The combination according to claim 1 further including means for applying adhesive to caps being fed to said liner punching and insert means by said feeding means, said means for applying adhesive being operated in synchronism with the operation of said liner punching and insert means.

3. The combination according to claim 1 wherein said liner punching and insert means includes an air cylinder for operating said punching and insert means.

4. The combination according to claim 1 wherein said liner punching and insert means is assembled in a module which is readily removable from the remainder of said cap-lining machine to facilitate changeovers to operation with caps of different diameters by replacing one liner punching and insert module means with a different liner punching and insert module means for different diameters of caps to be lined by said machine.

5. The combination according to claim 1 further including means for sensing the presence of liner at said liner punching and insert means and for preventing operation of said punching and insert means and said feeding means in the absence of liner at said punching and insert means.

6. The combination according to claim 1 further including third sensing means for sensing the retracted position of said punching and insert means and coupled with said feeding means to prevent operation of said feeding means when said punching and insert means is not in said retracted position.

7. The combination according to claim 6 further including means for sensing the presence of liner at said liner punching and insert means and for preventing operation of said punching and insert means and said feeding means in the absence of liner at said punching and insert means.

8. The combination according to claim 7 wherein said means for sensing liner comprises means for sensing the supply of liner into said liner punching and insert means and for sensing punched liner exiting from said liner punching and insert means, with failure of either of said liner sensing means operating to prevent further operation of said liner punching and insert means and of said cap feeding means.

9. The combination according to claim 8 further including means for applying adhesive to caps being fed to said liner punching and insert means by said feeding means, said means for applying adhesive being operated in synchronism with the operation of said liner punching and insert means.

10. The combination according to claim 1 further including means for automatically centering caps to be lined beneath said liner punching and insert means.

11. The combination according to claim 10 wherein said means for successively feeding caps to be lined to said liner punching and insert means includes a channel having a width greater than the outside diameter of said caps, and said feeding means indexes said caps one at a time into said channel.

12. The combination according to claim 11 wherein said centering means comprises a spring-biased three-point centering means, one point of which is a first edge of said channel and the other two points of which are located diametrically opposite said first edge at the other edge of said channel.

13. The combination according to claim 12 wherein said centering means comprises a pivoted arm having first and second spaced-apart rollers thereon, the axes of which are perpendicular to an axis through the center of a cap to be lined, with said arm being spring-biased toward the opening of said channel to cause said rollers to engage a cap moved into position beneath said liner punching and insert means by said feeding means.

14. The combination according to claim 13 wherein said means for sensing the presence of a cap at said liner punching and insert means comprises switch means carried by said pivoted arm.

15. The combination according to claim 14 wherein said liner punching and insert means includes an air cylinder for operating said punching and insert means.

16. The combination according to claim 14 wherein said liner punching and insert means is assembled in a module which is readily removable from the remainder of said cap-lining machine to facilitate changeovers to operation with caps of different diameters by replacing one liner punching and insert module means with a different liner punching and insert module means for different diameters of caps to be lined by said machine.

* * * * *